No. 631,143. Patented Aug. 15, 1899.
K. ABRAHAM.
UNIVERSAL FILTER.
(Application filed June 1, 1898.)
(No Model.) 2 Sheets—Sheet 1.
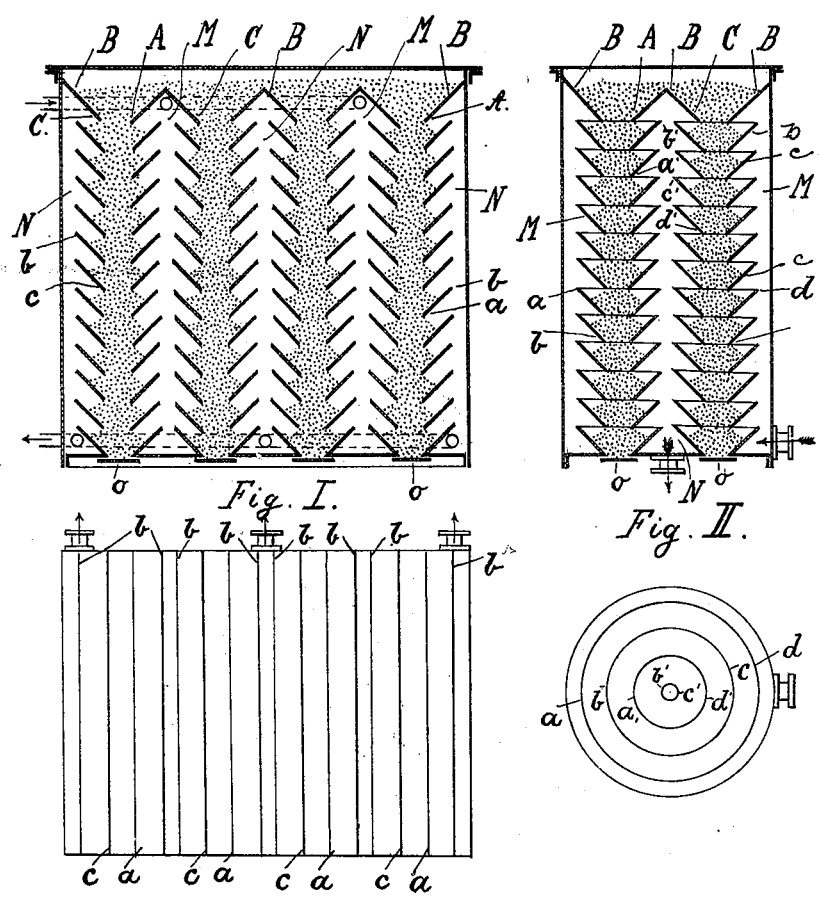
Witnesses:—
Jas. A. Richmond
W. C. Hill
Inventor
Karl Abraham
by G. Dittmar
his Attorney

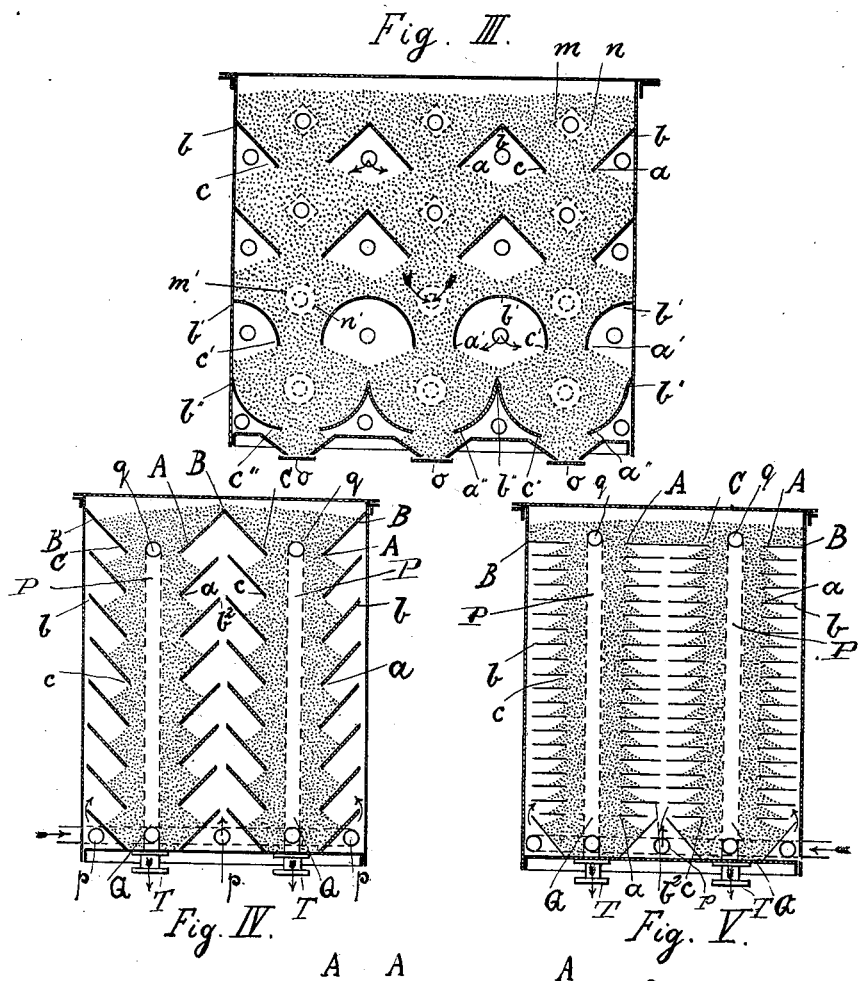

UNITED STATES PATENT OFFICE.

KARL ABRAHAM, OF KIEW, RUSSIA.

UNIVERSAL FILTER.

SPECIFICATION forming part of Letters Patent No. 631,143, dated August 15, 1899.

Application filed June 1, 1898. Serial No. 682,308. (No model.)

*To all whom it may concern:*

Be it known that I, KARL ABRAHAM, a subject of the Emperor of Russia, residing at 17 Malo-Schitomirskaja, Kiew, Russia, have invented Improvements in Universal Filters, of which the following is a specification.

Filtering apparatus as at present employed and in which a granular material—for instance, sand—is used have, with the exception of devices of very complicated construction, the disadvantage of necessitating such extensive arrangements that their applicability is very limited and that the granular filtering substances are in many cases to be substituted by substances of a more expensive nature, such as fabrics and the like. These disadvantages are removed by the present invention relating to a universal filtering apparatus, the construction of which admits of very extensive filtering-surfaces being produced in a comparatively small space. Filtering apparatuses of this improved kind essentially consist of box-shaped receptacles in which plates, roofings, diaphragms, or gratings of various shape are so arranged in various positions, that, after their covering or charging with granular filtering material, free spaces, chambers, and channels are formed, the several sides of which are limited by open sloping surfaces, formed by the filtering material. One portion of these chambers and channels receives the arriving liquid to be filtered, while another portion serves for discharging the filtered liquid.

In the accompanying drawings, Figure 1 represents in cross-section and plan, respectively, a box in which step-shaped rows of plates $a$ and $b$ are arranged obliquely and so that both ends meet the transverse walls of the box. Above these plates wider diaphragms B A C, Figs. 1 and 2, are provided. When a granular filtering material is thrown in from above, a row of vertical layers presenting a considerable surface of filtering material is formed, while at the same time free intermediate spaces M and N are produced. On then charging these spaces or chambers with the liquid to be filtered the latter passes as filtered matter into the chambers N, and thence arrives through special openings at the outside. If the filtering material becomes clogged up, it is discharged through manholes O, arranged at the bottom, and substituted by fresh material, after the apparatus having first been cleansed by rinsing.

Fig. 2 represents a circular filter likewise in cross-section and plan. $a\ b\ c\ d$ and $a'\ b'\ c'\ d'$ are truncated conical surfaces, the former presenting their apices downward and the latter presenting their apices upward. A B C is a complete conical surface, and B C A B a truncated conical surface, the upper part of which is in complete contact with the filter-casing. The whole system of cones is fixed by special frames, which are not represented in order that the clearness of the drawings may not be impaired. The layers of filtering material in this case are of annular shape. The liquid is introduced into the free outer space and is discharged through the central space. In a box of this kind evidently also a number of such annular systems may be arranged. Several systems may even be arranged concentrically. In certain cases it is advisable that the hollow spaces formed by plates and roofings should alternate with chambers which are limited by sieves, fabrics, or porous plates, in which case the former only receive the arriving liquid, while the latter receive the filtered matter. The sieves and the like in this case solely serve to maintain the granular material in a certain position, and as they come only in contact with purified liquid they are not subject to becoming clogged.

Fig. 3 represents, by way of example, a cross-sectional view of a box in which roofs or gable-shaped shields of any suitable form $a\ b\ c$ (or $a'\ b'\ c'$, $a''\ b''\ c''$ or the like) are arranged, while between them sieve-shaped prisms $m\ n$ or cylinders $m'\ n'$ covered with fabric are provided. After the box having been properly charged with sand or other suitable filtering material free spaces limited at two sides by the open top surface of the granular material are retained below the shields or roofings. The liquid passed into these hollow spaces traverses the filtering material, enters the sieve-shaped prisms $m\ n$ or cylinders $m'\ n'$, and is thence discharged.

Figs. 4 and 5 represent two combined halves of two essentially identical filters, the arrangement being such that according to Fig. 4 roof-shaped shields $a\ c$, provided with openings at $b^2$, are covered over at the top with shields A B C, having no openings. At the right and left hand of the box only halves of shields or diaphragms of the same kind are arranged. Between each two vertical systems of such shields or diaphragms a chamber P Q is formed by means of sieves or fabric stretched out upon frames. The liquid enters the hollow spaces at $p$ below the shields, traverses the granular material, enters the sieves P Q, and is thence discharged to the outside by special spouts or outlets T. The device shown in Fig. 5 only differs from that represented in Fig. 4 inasmuch as the shield or diaphragms are located horizontally with the exception of the lowermost.

In conformity with the type shown in Figs. 4 and 5 circular filters may likewise be constructed. Such circular filters would, for instance, be formed if the conical surfaces $a'$ $b'$ $c'$ $d'$ in Fig. 2 were substituted by a continuous cylindrical sieve.

Fig. 6 is a sectional view of a modified form of filter wherein the shields are removable separately or in sets, showing also the frames P' Q' and sieves R S in detail.

All the described filters may be so constructed that the shields admit of their being readily removed either separately or in sets. The filters may also be constructed analogous to filter-presses, Fig. 6 representing, for instance, one out of many possible constructional devices of this kind. In this instance within the frame A B frames P' Q' with stepped gratings, as described, and sieves R S are arranged. The liquid to be filtered enters in the known manner (by way of a longitudinal channel traversing all frames) the hollow spaces which are retained between each two frames P' Q', penetrates the filtering-layers at the right and left, and is discharged from the sieve-chambers R S through openings. For the purpose of cleansing the apparatus the frames A B are drawn apart, the frames P' Q' removed, the filtering material rinsed out, and after the frames P' Q' having then again been put in place fresh filtering material is introduced by means of a feed device.

In all the filtering devices described the liquid is filtered only once. Filtering apparatus for obtaining repeated filtration may, however, likewise be constructed on the same principle. Thus, for instance, in the case of the filter represented in Fig. 1 the liquid solely passed into the central space N may be caused to traverse two layers, one at the right and one at the left, and be subsequently discharged through lateral spaces N. In this case each filtering-layer may be exchanged separately and independently of the others.

Instead of the soiled filtering material being exchanged it may be simply rinsed out of the apparatus by causing a liquid current to act in the inverse direction upon the filtering-layers and by causing the rinsed-out impurities, together with any filtering material that may be carried away, to pass off through special conduits. The filtering material may also in a continuous manner be drawn off and conveyed into a receptacle communicating with the filter, this being effected by helices or other conveying devices arranged below the filtering-layers. In this case the filtering material would be replaced from above, in proportion as it is discharged, through the medium of feed-hoppers, so as to settle down automatically. The soiled material may then be automatically passed to a suitable place for repurification.

I claim—

1. In a filter, the combination of a suitable container, a plurality of rows of plates obliquely arranged therein, relatively to each other, and adapted to sustain a granular filtering medium in columns, dividing said container into independent compartments, a water-supply pipe adapted to admit water to every alternate compartment, and an eduction-pipe in connection with the other compartments, adapted to draw off the filtered water therefrom, substantially as illustrated and described.

2. In a filter, the combination of a suitable container, a series of divergently formed and superposed shelves or panels with columns of a granular filtering medium supported thereby and dividing said container into separate compartments or passages, and means for admitting water to some of said compartments, whereby it is adapted to filter through the granular filtering medium and escape into the other compartments, from whence it may be drawn off, substantially as described.

In testimony that I claim the foregoing as my invention I have signed my name in presence of two subscribing witnesses.

K. ABRAHAM.

Witnesses:
 W. E. STONE,
 THOS. E. HEENAN.